United States Patent
Jung

(10) Patent No.: US 7,167,721 B2
(45) Date of Patent: Jan. 23, 2007

(54) METHOD OF REQUESTING AN EMERGENCY RESCUE IN A MOBILE COMMUNICATION TERMINAL HAVING A BLUETOOTH DEVICE

(75) Inventor: Woo-Suk Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 313 days.

(21) Appl. No.: 10/232,731

(22) Filed: Aug. 29, 2002

(65) Prior Publication Data
US 2003/0125010 A1 Jul. 3, 2003

(30) Foreign Application Priority Data
Dec. 29, 2001 (KR) .................... P2001-0088386

(51) Int. Cl.
*H04M 1/00* (2006.01)
*H04M 1/40* (2006.01)

(52) U.S. Cl. ............... 455/553.1; 455/41.3; 455/41.2; 455/459; 455/456.3; 455/404.2; 455/404.1; 379/38; 379/40; 379/51; 379/45

(58) Field of Classification Search ............ 455/404.1, 455/404.2, 440, 414.2, 414.3, 574, 572, 343, 455/421, 525, 161.1, 41.3, 41.2, 459, 456.3, 455/553.1; 370/345, 342; 379/45, 38, 40, 379/51
See application file for complete search history.

(56) References Cited

U.S. PATENT DOCUMENTS

| | | | | |
|---|---|---|---|---|
| 6,535,752 | B1 * | 3/2003 | Dent | 455/574 |
| 6,671,351 | B1 * | 12/2003 | Menard et al. | 379/45 |
| 2001/0002906 | A1 * | 6/2001 | Rune | 370/345 |
| 2002/0169539 | A1 * | 11/2002 | Menard et al. | 701/200 |

FOREIGN PATENT DOCUMENTS

KR 2001-41948 7/2001

* cited by examiner

Primary Examiner—Charles Appiah
Assistant Examiner—Randy Peaches
(74) Attorney, Agent, or Firm—The Farrell Law Firm

(57) ABSTRACT

A method of requesting emergency rescue in a mobile communication terminal having a Bluetooth device. The method comprises the steps of: computing position information of the terminal in case of emergency; switching into a sleep mode after computing the position information of the terminal; transmitting an emergency-informing packet containing the position information into the Bluetooth device after switching into the sleep mode; and executing by the Bluetooth device communication with another nearby Bluetooth device.

11 Claims, 7 Drawing Sheets

METHOD OF REQUESTING AN EMERGENCY RESCUE IN A MOBILE COMMUNICATION TERMINAL HAVING A BLUETOOTH DEVICE

PRIORITY

This application claims priority to an application entitled "METHOD OF REQUESTING EMERGENCY RESCUE IN MOBILE COMMUNICATION TERMINAL HAVING BLUETOOTH DEVICE" filed in the Korean Intellectual Property Office on Dec. 29, 2001 and assigned Serial No. 2001-88386, the contents of which are hereby incorporated by reference.

BACKGROUND OF THE INVENTION

1. Field of the Invention

The present invention relates to a mobile communication terminal having a Bluetooth device, and more particularly, to a method of communication by using the Bluetooth device in case of emergency.

2. Description of the Related Art

In the application, it is intended that the term "mobile communication terminal" includes all kinds of potential mobile communication terminals such as a cellular phone, a Personal Communication System (PCS), a Personal Data Assistant (PDA), an International Mobile Communication-2000 (IMT-2000) terminal, etc.

The use of mobile communication terminals is rapidly spreading due to convenience and portability. Accordingly, service providers (or terminal manufacturers) are competing for providing more specialized services in order to secure more consumers. As an instance, an emergency rescue service is performed to locate a mobile terminal and transmit the position of the terminal into a nearby police station or a fire station when the terminal is periodically call-linked to a base station in case of an emergency. However, maintaining the call-link consumes electric power in the range of 300 to 700 mA, thereby discharging a large amount of battery power from the terminal. That is to say, though it is critical to prolong the operation time of the terminal in case of emergency, it is fatal if power is consumed due to periodic determination of position data.

Further, a terminal without communication performs a slotted mode consuming electric power for about 90 to 100 mA in switching from a sleep state into an idle or wakeup state. That is, the terminal switches into the slotted mode if any communication is not executed for a certain time period and then wakes up for a certain time period to inspect any call signal consuming electric power for about 80 ms. Further, the terminal confronts other power consuming situations, e.g., the terminal is required to wake up before an allocated slot in order to execute a system reacquisition operation and operate an interleaver and a decoder in order to confirm a call message or a control message. In case of emergency, it is critical to prolong the operation time of the terminal until a person in distress is rescued. However, since power is consumed by a large amount even in the idle sleep state where communication is not actually executed, it is not desirable to keep the terminal in the slotted mode. That is, a method is needed which can prolong the operation time of the terminal in case of emergency.

Recently, as a mutual link among various information communication devices such as a PC (Personal Computer), a mobile telephone, a PDA (Personal Digital Assistant), etc., is needed, a new communication standard called Bluetooth has recently appeared. Bluetooth was released in common from 5 companies including Ericsson of Sweden, IBM and Intel of the United States, Nokia in Finland and Toshiba in Japan, and characterized in realizing a local data communication among information communication devices in radio which has been generally made through cable connection or infrared data (IrDA) communication.

Bluetooth is better than the IrDA communication since it can execute communication even with an obstacle in the way that would normally disrupt communication, by using a high radio frequency of 2.5 GHz with a data transmission rate of 1 to 10 Mbps and a transmission distance of 10 to 100 m. Further, Bluetooth can execute high data exchange while consuming a low amount of power as well as ensure communication security in data transmission.

Executing communication via Bluetooth without using a terminal in case of emergency rescue may reduce the power consumption of the terminal, which is normally caused as the terminal periodically determines position data and is operated in the slotted mode.

Accordingly, the present invention has been designed to solve the foregoing problems.

SUMMARY OF THE INVENTION

It is, therefore, an object of the present invention to provide a method of computing position information of a mobile communication terminal and then switching into a sleep mode in the mobile communication terminal in case of emergency.

It is another object of the invention to provide a method for communicating in a mobile communication terminal with a Bluetooth device by using the Bluetooth device in case of emergency.

It is still another object of the invention to provide a method of switching into a sleep mode by computing position information of a mobile communication terminal having a Bluetooth device and then transmitting the position information of the terminal using the Bluetooth device.

According to an aspect of the invention, to obtain the above objects, a method is provided for requesting emergency rescue in a mobile communication terminal having a Bluetooth device. The method comprises the steps of: computing position information of the terminal in case of emergency; switching into a sleep mode after computing the position information of the terminal; transmitting an emergency-informing packet containing the position information into the Bluetooth device after switching into the sleep mode; and executing by the Bluetooth device communication with another nearby Bluetooth device.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention in reference to the accompanying drawings, in which well-known functions or constructions are not be described in detail since they would obscure the invention in unnecessary detail.

Hereinafter description will be given of a technology allowing a mobile communication terminal to compute position information thereof, switch into a sleep mode, and then transmit the position information thereof with a Bluetooth device consuming a small quantity of electricity in order to reduce battery consumption of the terminal in case of emergency. In the application, the position information will not be described in detail since it is computed via the gpsOne, a GPS receiver and a well-known positioning algorithm. Although it will be described that the terminal transmits the position information of the terminal with the Bluetooth device, other forms of emergency rescue requesting signals may be used.

The following description will first present a discussion about a Bluetooth system in which the invention may be applied.

Figure 1:
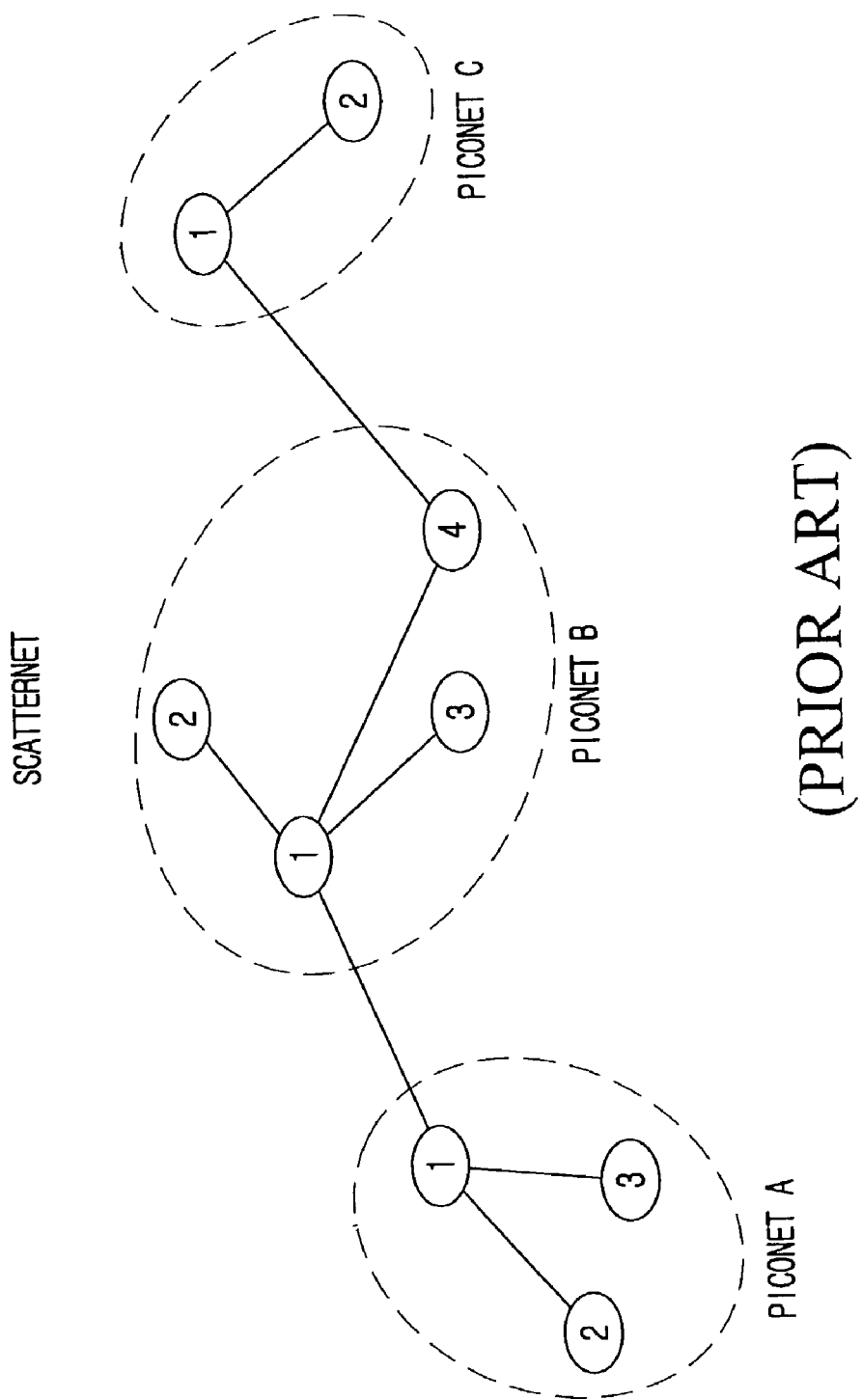
FIG. 1 illustrates a network construction of a general Bluetooth system.

In general, a Bluetooth system provides point-to-point connection or point-to-multipoint connection. In the point-to-point connection, an identical channel is shared by a plurality of devices capable of executing Bluetooth communication (hereinafter referred to as 'Bluetooth devices'). At least two Bluetooth devices share the same channel to form a piconet, in which one of the Bluetooth devices, which primarily initialized communication, operates as a master while other Bluetooth devices operate as slaves. The master controls channel access of the slaves. A plurality of piconets constitutes a scatternet when they have an overlapped service area. Herein, the master of any piconet may operate as a slave in another piconet. FIG. 1 illustrates the construction of such a scatternet.

As illustrated in FIG. 1, three piconets (i.e. piconets A, B and C) are associated to constitute one scatternet, in which the master of each of the piconets serves as the first Bluetooth device. The first Bluetooth device operating as the master of the piconet A serves as a slave of the piconet B. Utilizing such a property allows communication restricted to the existing piconet to extend to other piconets as disclosed in Korean Patent Application No. 2001-41948 previously filed by the assignee of the invention.

Figure 2:
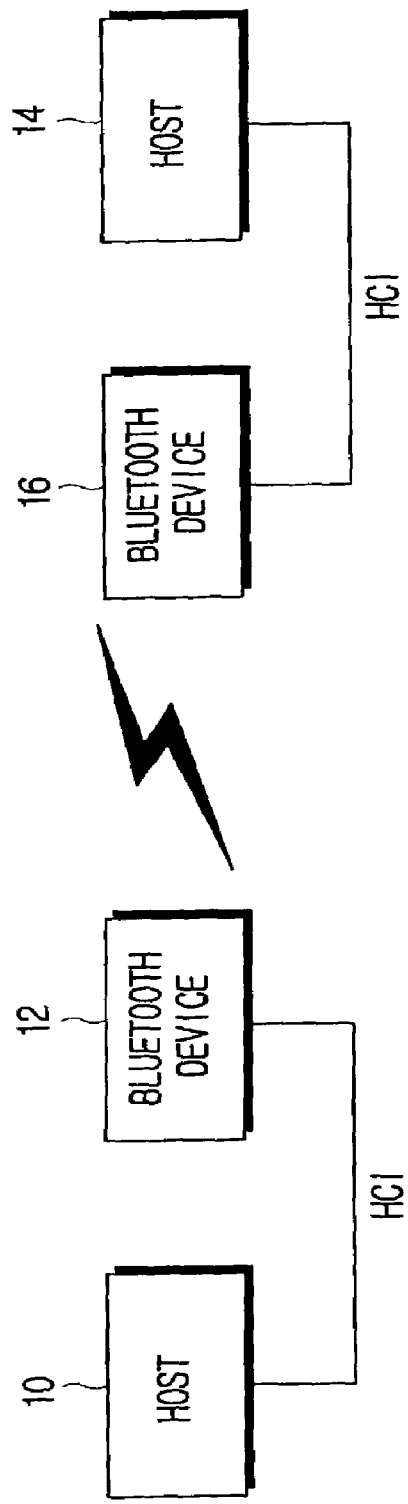
FIG. 2 is a schematic block diagram of a Bluetooth system to which the invention may be applied.

FIG. 2 is a block diagram schematic illustrating a Bluetooth system to which the invention may be applied. In FIG. 2, hosts 10 and 14 serve main roles for communication while Bluetooth devices 12 and 16 accept requests from the hosts 10 and 14 to allow communication according to Bluetooth standards. An interface called a Host Control Interface (HCI) is defined between each host 10 or 14 and each Bluetooth device 12 or 16 while a message corresponding to the HCI (hereinafter will be referred to as 'HCI packet') is exchanged to allow transfer/receiving of control commands, results thereof, and transmission/receiving data of a user. The HCI packet is transferred in practice by using the well-known RS232 as well as the Universal System Bus (USB), the standard PC interface and so on. The HCI packet is divided into command, event, and data packets, in which the command packet provides about 60 command languages according to the standard specification so that the Bluetooth devices can be variously utilized. Hereinafter the hosts 10 and 14 will be assumed as mobile communication terminals in description.

Figure 3:
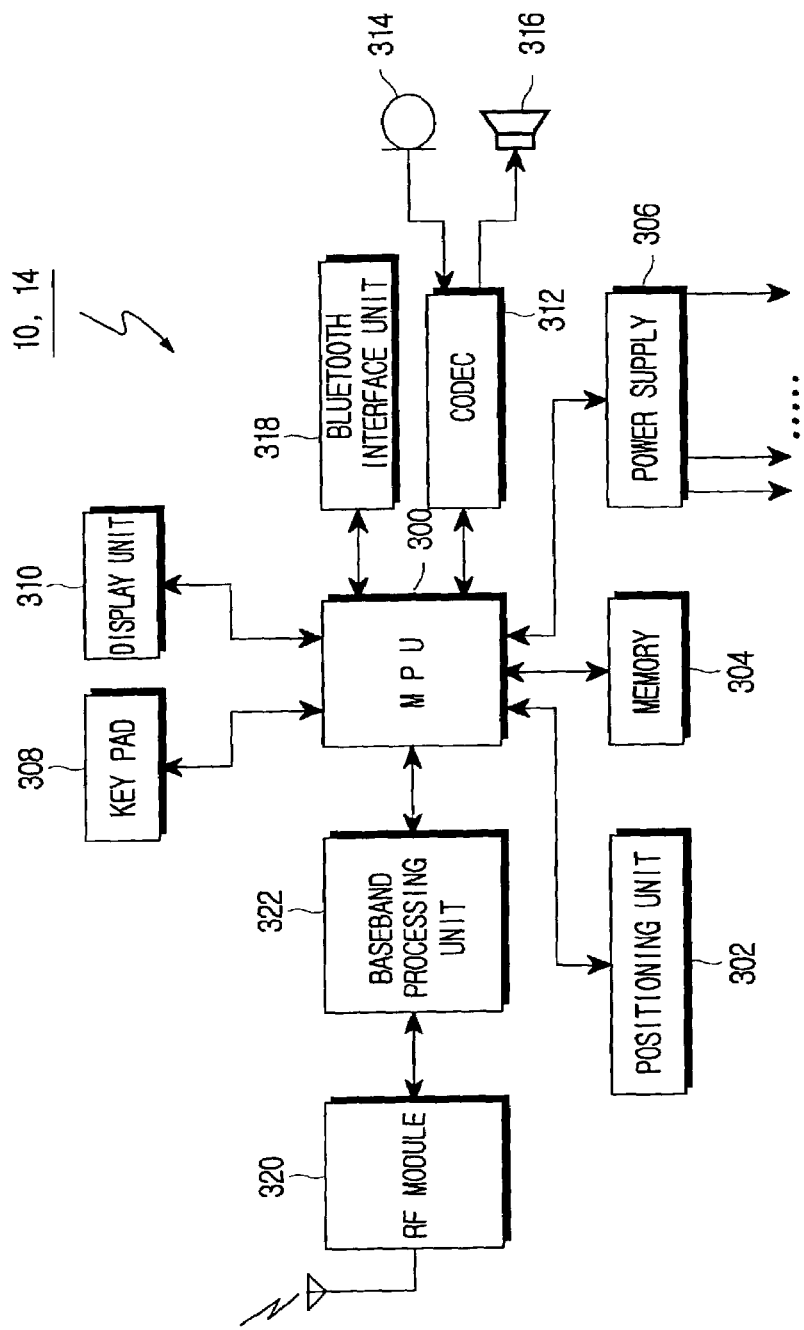
FIG. 3 is a block diagram of a mobile communication terminal according to an embodiment of the invention.

FIG. 3 is a block diagram of a mobile communication terminal according to an embodiment of the invention, in which the mobile communication terminal corresponds to each host 10 or 14 illustrated in FIG. 2. In FIG. 3, a control unit or Micro-Processor Unit (MPU) 300 controls the overall operation of the communication terminal. For example, the MPU 300 executes processing and control for audio conversation and data communication as well as processes operations for transmitting position data via the Bluetooth device in case of emergency in addition to conventional functions. Therefore, conventional processing and control of the MPU 300 will not be discussed in the following description. A memory 304 stores micro codes of a program for executing processing and control of the MPU 300, various reference data and temporary data generated during executing of various programs. In particular, the memory 304 stores a program for executing communication with the Bluetooth device of the invention and another program for transmitting the position data of the terminal in case of emergency.

A keypad 308 has number keys from 0 to 9 as well as a number of function keys such as menu, enter, text transmission, talk, clear, end, *, #, navigation, and emergency keys, while providing the MPU 300 with key input data corresponding to key input of a user. A display unit 310 displays state information, a restricted number of texts, a large quantity of multimedia, and still images generated during operation of the mobile communication terminal. The display unit 310 can use a color Liquid Crystal Display (LCD).

A codec (Coder-Decoder) 312 connected to the MPU 300, a microphone 314, and a speaker 316 constitute an audio input/output block in use for telephone conversation and audio recording. The codec 312 converts PCM data received from the MPU 300 into analog audio signals to transmit the analog audio signals via the speaker 316 while converting audio signals received via the microphone 314 into PCM data to provide the same to the MPU 300.

Further, a Radio Frequency (RF) unit 320 drops the frequency of RF signals received via an antenna and then provides the frequency-dropped signals to baseband processing unit 322. On the other hand, the RF unit 320 elevates the frequency of baseband signals from a baseband processing unit 322 to transmit the frequency-elevated signals via the antenna. The baseband processing unit 322 processes the baseband signals transmitted between the RF unit 320 and the MPU 300. For example, in case of transmission, the baseband processing unit 322 channel codes and spreads transmission messages. During a receiving, the baseband processing unit 322 restores received messages through despreading and channel decoding received signals.

A power supply 306 drops a voltage applied from a battery into a suitable level of DC voltage and then provides the DC voltage to components each mounted in the terminal. In other words, the components of the terminal are operated on the driving voltage provided from the power supply 106. In case of emergency, the power supply 306 realizes a sleep mode by blocking the driving voltage provided to the components except for the minimum required for communication with the Bluetooth device under the control of the MPU 300. This reduces power consumption in an emergency situation. A positioning unit 302 functions to locate the terminal.

It is assumed that the positioning unit 102 uses a GPS receiver, such as the gpsOne mounted in an MSM chip available from Qualcomm, and a well-known positioning algorithm. In case of emergency, the MPU 300 generates an emergency-informing message or HCI including position information generated from the positioning unit 302 and then transmits the emergency-informing message into the Bluetooth device. A Bluetooth interface unit 318 functions to interface signals with the Bluetooth device linked thereto. The Bluetooth interface unit 318 uses the Universal System Bus (USB), the standard PC interface and so on, in addition to the well-known RS232 as set forth above.

Figure 4:
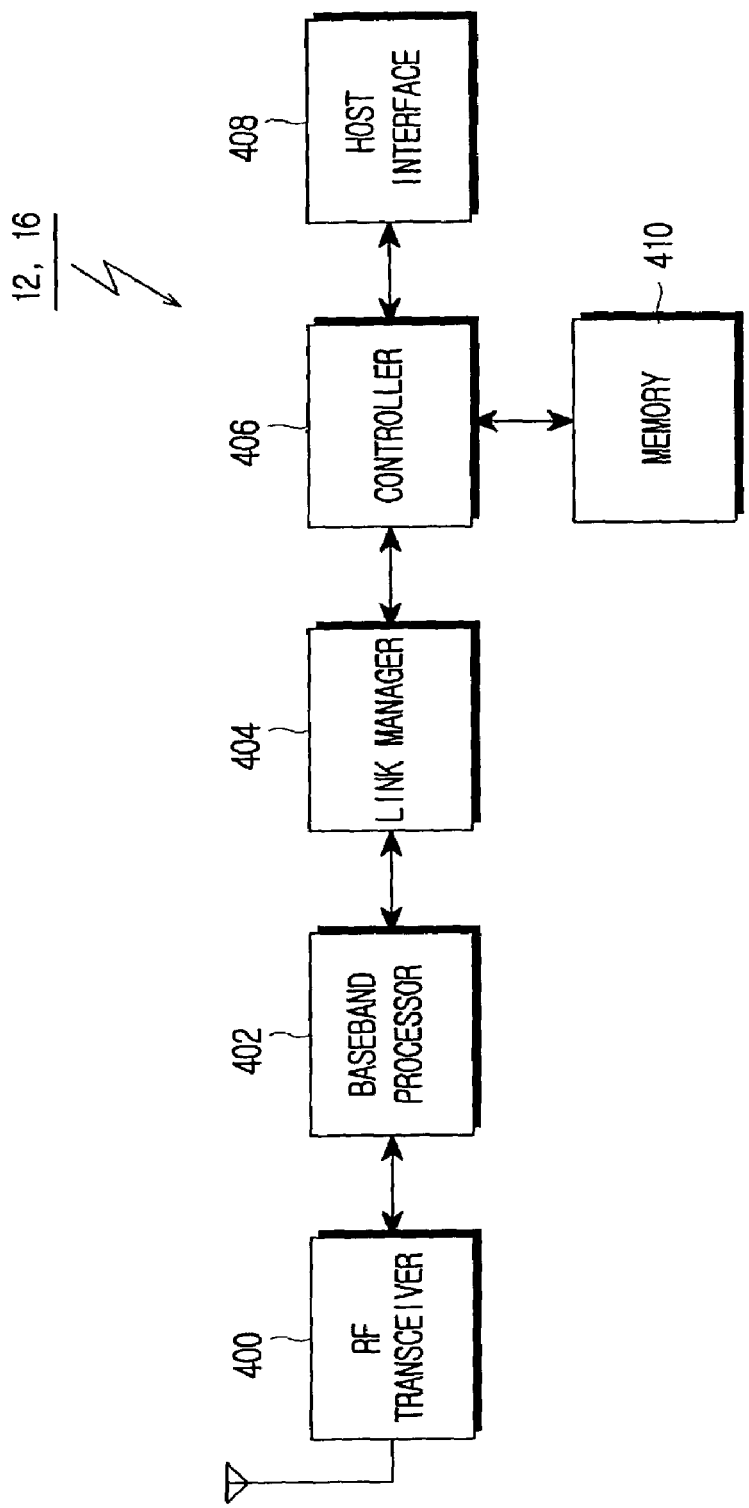
FIG. 4 is a block diagram of a Bluetooth device provided in the mobile communication terminal according to the embodiment of the invention.

FIG. 4 is a block diagram of the Bluetooth device provided in the mobile communication terminal according to an embodiment of the invention, in which the Bluetooth device corresponds to the Bluetooth devices 12 and 16 illustrated in FIG. 2. In FIG. 4, a controller 406 controls the overall operation of the Bluetooth device while processing the HCI packet transmitted/received via a host interface 408. A memory 410 stores a variety of programs for controlling the operation of the Bluetooth device and temporary data generated during executing the programs. In particular, the memory 410 stores information of nearby Bluetooth devices (e.g. IP list) by using an inquiry function for searching the nearby Bluetooth devices.

A link manager 404 processes messages exchanged with another Bluetooth device in a link level. That is, the link manager 404 undertakes a role of a security while functioning to generate, exchange, and inspect a link or encoder, and to control the packet size of the baseband. Further, the link manager 404 controls a power mode, a cycle of a Bluetooth radio device, and a link state of a piconet. A baseband processor 402 generates the packet by coding or ciphering a message generated from the link manager 404. The baseband processor 402 also converts and outputs the generated packet into a baseband analog signal. On the other hand, the baseband processor 402 converts an analog signal received from an RF transceiver 400 into a digital packet, and decodes or deciphers the packet to restore a receive message. The RF transceiver 400 modulates any output signal from the baseband processor 402 into an RF signal via frequency hopping, transmits the modulated RF signal via the antenna after filtering the same, and converts any RF signal received via the antenna into a baseband analog signal to provide the converted analog signal to the baseband processor 402.

Figure 5:
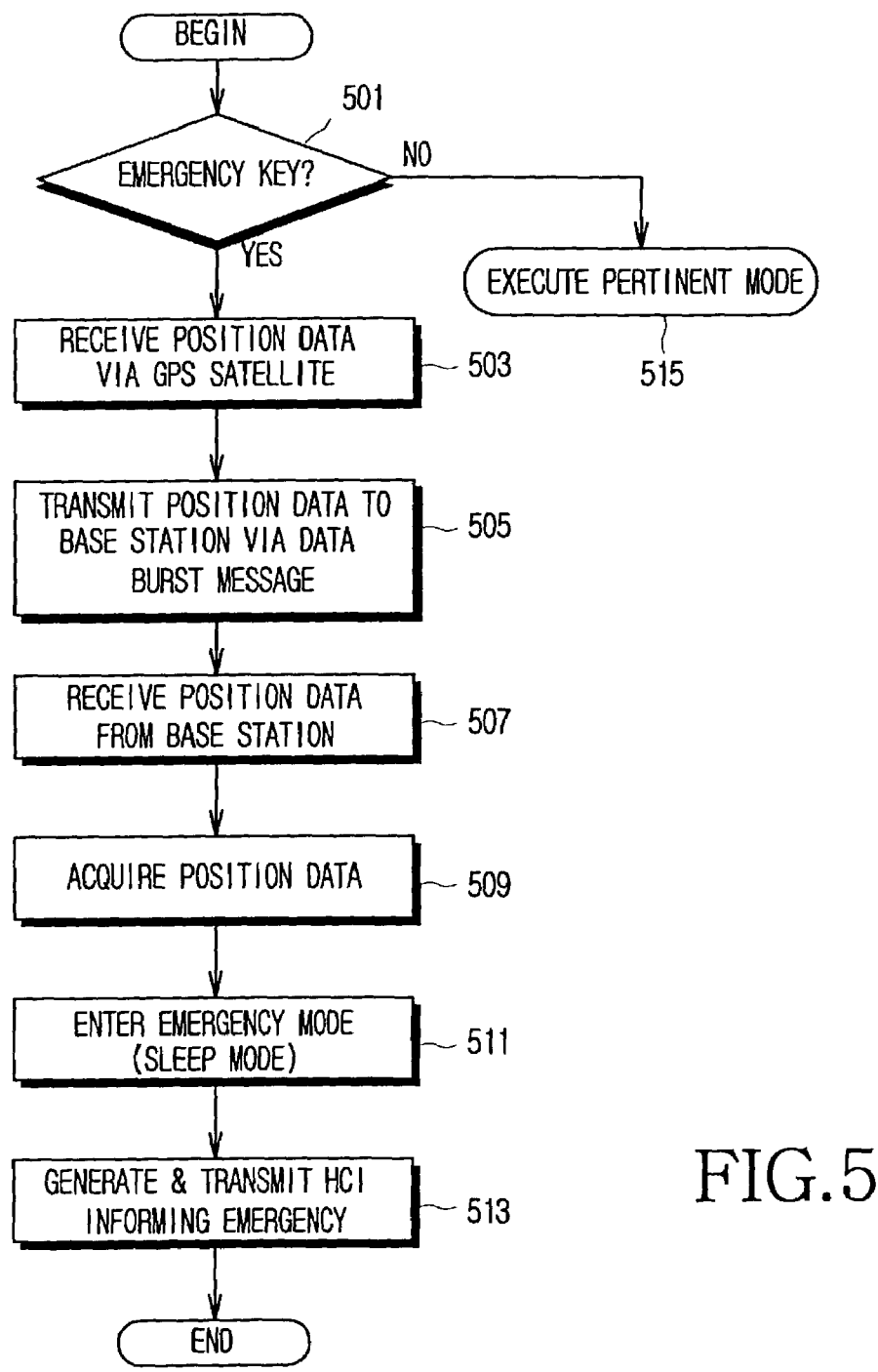
FIG. 5 is a flow chart of a control process for switching into a sleep mode just after transmitting position data in case of emergency in the mobile communication terminal having the Bluetooth device according to the embodiment of the invention.

FIG. 5 is a flow chart of a control process for entering the sleep mode just after transmitting position data in case of emergency in the mobile communication terminal having the Bluetooth device according to the embodiment of the invention. Hereinafter it is assumed that positioning of the terminal is executed according to the gpsOne algorithm mounted in an MSM chip available from Qualcomm.

Referring to FIG. 5, the MPU 300 of the mobile communication terminal inspects whether the emergency key is inputted by a key input of the user in step 501. The emergency key may be realized as a single function key or through several key inputs. If the emergency key is not inputted, the MPU 300 proceeds to step 515 to execute a pertinent mode. If the emergency key is inputted, the MPU 300 proceeds to step 503 to receive a position data via a GPS satellite. In step 505, the MPU 300 transmits the received position message to a base station via a data burst message. Herein the base station computes position information of the terminal using the position data received from the terminal and information provided from a network and then transmits the computed position information into the terminal. That is, the terminal receives a message including the position information of the terminal from the base station in step 507, and analyzes the message to acquire the position information in step 509. In the above steps, the base station transmits the computed position information of the terminal to a nearby fire station or police station to inform an emergency rescue request. Alternatively, the terminal may compute the position information by itself and then transmit the emergency rescue request including the position information.

Then, the MPU 300 enters the sleep mode by controlling the power supply 306 to block the driving voltage provided to the each component of the terminal in step 511. That is, the MPU 300 deactivates the components except the minimum required for communication with the Bluetooth device. This reduces power consumption of the terminal in case of emergency.

After entering the sleep mode in step 511, the MPU 300 generates an emergency-informing message to be transmitted to the Bluetooth device 12 in step 513. The emergency-informing message is an HCI packet defined in the Bluetooth standard as set forth above, and contains the position information of the terminal calculated above. The MPU 300 transfers the emergency-informing message to the Bluetooth device 12 via the Bluetooth interface unit 318. Then, the Bluetooth device 12 analyzes the message to recognize an emergency, and then makes an attempt to communicate with any nearby Bluetooth device. Related operations will be described in detail in reference to FIG. 6.

In the meantime, the sleep mode can be executed for a certain time period or deactivated through a key action of the user. If the sleep mode is canceled, the terminal switches into a normal mode to execute a general idle slotted mode.

Figure 6:
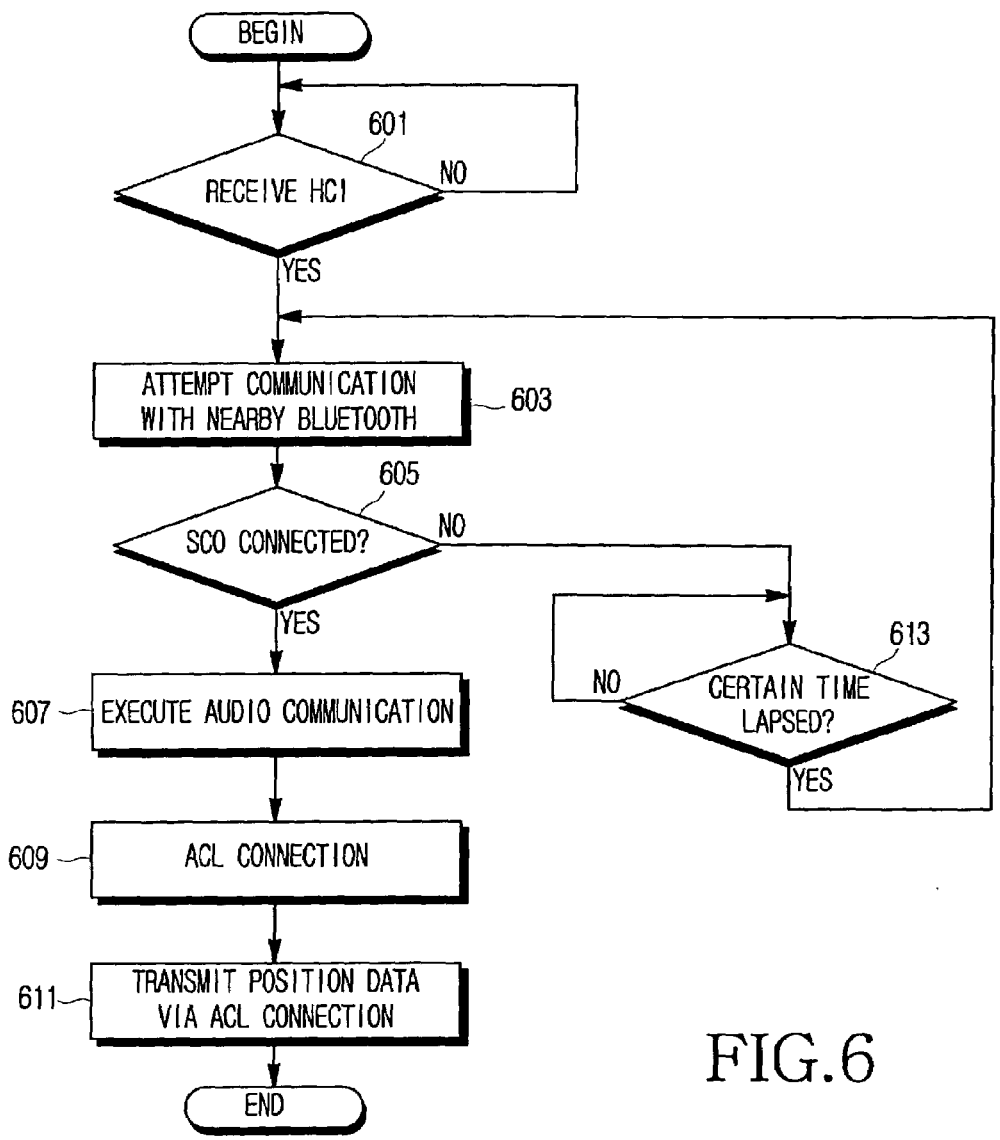
FIG. 6 is a flow chart of a process executed by the Bluetooth device in an emergency mode according to the embodiment of the invention.

After the terminal switched into the sleep mode, the Bluetooth device 12 executes operations described as follows. FIG. 6 illustrates the operations executed by the Bluetooth device in an emergency mode according to the embodiment of the invention. In FIG. 6, the controller 406 inspects whether an HCI packet (emergency-informing packet) is received via the Bluetooth interface unit 318 of the terminal in step 601. If the emergency-informing packet is received, the controller 406 proceeds to step 603 to attempt communication with a nearby Bluetooth device.

In general, the Bluetooth device executes an inquiry procedure for detecting and collecting the unique address and clock of a Bluetooth device in a certain range before setting a link for communication and then executes a paging procedure for setting a link for data transmission. The Bluetooth device utilizes two types of links such as an Asynchronous Connectionless (ACL) and a Synchronous Connection Oriented (SCO). The type of link can be changed during connection. The SCO link is for synchronous circuit-switched communication via point-to-point link whereas the ACL link is for asynchronous packet communication via point-to-multipoint link. Transmission/receiving of broadcast messages is executed via the ACL link. That is, the controller 406 connects the SCO link in order to perform a conversation with a nearby Bluetooth device.

In step 605, the controller 406 inspects whether the SCO link is connected for audio conversation. If it is judged that the SCO link is connected, the controller 406 proceeds to step 607 to switch an audio packet through the SCO link. If the SCO link is not connected, the controller 406 proceeds to step 613 and then stands by for a certain time period. Then, after the certain time period lapses, the controller 406 returns to step 603 to attempt communication with a nearby Bluetooth device.

After executing the audio conversation in step 607, the controller 406 connects the ACL link for broadcasting the position information of the terminal in step 609. The controller 406 proceeds to step 611 to transmit the packet containing the position information of the terminal to the nearby Bluetooth device via the ACL link at a certain period. Herein, the packet containing the position information of the terminal may be transmitted into a Bluetooth device having a certain IP address or be broadcasted to a number of nearby Bluetooth devices.

Upon receiving the packet containing the position information of the terminal (hereinafter referred to as an "emergency rescue-requesting packet"), a Bluetooth device recognizes that the Bluetooth device 12 is in an emergency and transfers a result of recognition to a host. Then, the host executes a predetermined emergency rescueinforming operation. This emergency rescue-informing operation may include vibration, a bell, a text display, etc., so long as they can be defined by a manufacturer or a user. Alternatively, if radio or wire network connection is available for the nearby Bluetooth device, a call is automatically connected to a predetermined nearby police station or fire station. Then information (ID, position information, etc.) related to the Bluetooth device 12 requesting an emergency rescue can also be transferred to the police and fire stations.

Further, information related to the Bluetooth device 12 can be transferred to other nearby Bluetooth devices. This is because a slave device of a specific piconet can function as a master device of another piconet in a scatternet. That is, if a slave device that received the emergency rescue requesting packet operates as a master device of another piconet, the slave device can transmit the emergency rescue packet to slave devices connected thereto.

The following description will discuss a technique for transmitting the emergency rescue-requesting packet to a slave device of another piconet. Hereinafter, a description will be made about a method of transmitting the emergency rescue-requesting packet to a slave device having a specific IP address of another piconet.

Figure 7:
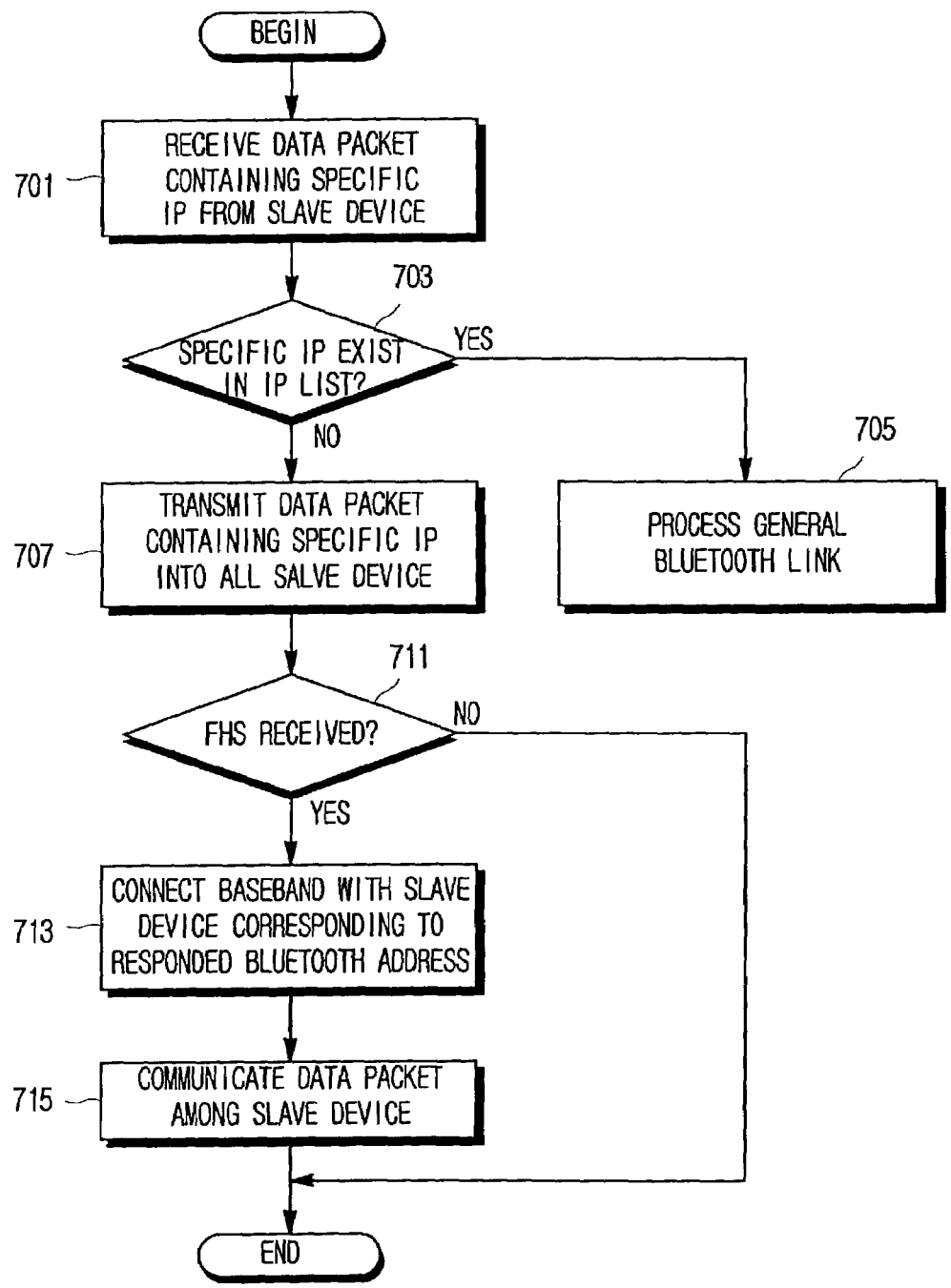
FIG. 7 is a flow chart of a process for transmitting an emergency rescue-requesting message to another piconet in a master device according to the embodiment of the invention.

FIG. 7 is a flow chart of a process for transmitting the emergency rescue-requesting packet to another piconet in a master device according to the embodiment of the invention. For ease of description, hereinafter, the master device will be assumed as the Bluetooth device 16 that has received the emergency rescue-requesting packet from the Bluetooth device in the emergency. Further, it is assumed that the emergency rescue-requesting packet is designated to a specific receiver (i.e. a Bluetooth device having a specific IP address).

Referring to FIG. 7, the controller of the Bluetooth device 16 receives a data packet containing a specific IP address from the slave device 12 in step 701. The data packet contains information for emergency rescue request (e.g., position information of the terminal). Then, the controller searches the IP list stored in the memory to confirm whether the received specific IP address exists in step 703. As set forth above, the Bluetooth device acquires IP addresses of nearby Bluetooth devices via inquiry procedures and stores the same in the memory.

If the specific IP address exists in the memory in step 703, the controller proceeds to step 705 to execute a general Bluetooth link procedure. On the contrary, if it is determined that the specific IP address does not exist in the memory, the controller proceeds to step 707 to transmit the data packet containing the received specific IP address to all slave devices. Accordingly, all of the slave devices connected to the Bluetooth device receive the data packet containing the specific IP address in step 707.

In a scatternet, a Bluetooth device can function as a slave in a piconet while functioning as a master in another piconet. So among the slave devices which received the packet, a Bluetooth device functioning as a master device (hereinafter will be referred to as "dual mode Bluetooth device") searches an IP list acquired from slave devices of its piconet and stored therein to confirm whether the specific IP address exists. If any matching IP address exists, the received data packet is transmitted into a pertinent slave device having the IP address. Upon receiving the data packet, the slave device transmits a response packet or Frequency Hopping Selection (FHS) into the Bluetooth device functioning as the master device. Accordingly, the FHS is transmitted into the dual mode Bluetooth device 16.

That is to say, after transmitting the data packet, the controller of the Bluetooth device 16 confirms whether the FHS is received in step 711. If the FHS is not received within a certain time period, the process is terminated. If the FHS is received within the certain time period, the controller proceeds to step 713 to set baseband link with the dual mode Bluetooth device. The data packet is transferred to the slave device having the specific IP address via the dual mode Bluetooth device.

Although the embodiment discusses a technique for enlarging a range of communication for communicating with a Bluetooth device having a specific IP address, any packet designated to no specific receiver (e.g. packet to be broadcasted) may be continuously transmitted into other piconets via any Bluetooth devices, each functioning as a slave and master in the scatternet. That is, if the emergency rescue requesting packet of the invention has a property of broadcasting, the emergency rescue requesting packet may continuously be transmitted to other piconets via dual mode Bluetooth devices in the scatternet. This can enlarge the communication range, which was restricted to the piconet.

According to the invention as set forth above, the terminal is set in the sleep mode and communication is executed via the Bluetooth device in case of emergency so as to reduce power consumption by the terminal. That is, the operation time of the terminal can be prolonged to raise the rescuing rate of people in accidents. Moreover, the communication range is enlarged in the communication using the Bluetooth device to raise the rescuing rate of the people in accident.

Although the specific embodiments of the present invention have been disclosed for illustrative purposes in the above detailed description, those skilled in the art will appreciate that various modifications, additions, and substitutions can be made without departing from the scope and spirit of the invention as disclosed in the accompanying claims. Accordingly, it shall be understood that the scope of the invention is not restricted to the above embodiments but is defined by the accompanying claims and equivalents thereof.

What is claimed is:

1. A method of requesting an emergency rescue in a mobile communication terminal having a Bluetooth device, the method comprising the steps of:

computing position information of the mobile communication terminal in case of emergency;

switching the terminal into a sleep mode after computing the position information;

transmitting an emergency-informing packet containing the position information to the Bluetooth device after switching into the sleep mode so as to prolong the operation time of the mobile communication terminal;

determining whether the emergency-informing packet contains position information of the mobile communication terminal, after the mobile communication terminal enters the sleep mode; and executing by the Bluetooth device communication with a nearby Bluetooth device, wherein said sleep mode is performed to block driving voltage provided to each component of the terminal except for the Bluetooth communication.

2. The method of claim 1, wherein said step of executing communication with the nearby Bluetooth device comprises the steps of:

if a first link is connected for audio conversation, executing audio communication with the nearby Bluetooth device via the first link; and if a second link is connected for data communication, periodically transmitting a packet containing the position information of the terminal to the nearby Bluetooth device via the second link.

3. The method of claim 2, wherein the packet containing the position information is transmitted by a dual mode Bluetooth device functioning as a slave device in a first piconet and as a master device in a second piconet, into yet another Bluetooth device in a third piconet.

4. The method of claim 2, wherein the first link is a synchronous connection oriented link.

5. The method of claim 2, wherein the second link is an asynchronous connectionless link.

6. A method of requesting an emergency rescue in a Bluetooth device connected to a mobile communication terminal, the method comprising the steps of:

receiving an emergency-informing packet containing position information related to the mobile communication terminal from the mobile communication terminal in case of an emergency;

determining whether the packet is an emergency-informing packet containing position information of the mobile communication terminal, after the mobile communication terminal enters a sleep mode; and periodically transmitting a radio packet containing the position information to another Bluetooth device when the emergency-informing packet is received, wherein said sleep mode is performed to block driving voltage provided to each component of the terminal except for the Bluetooth communication.

7. The method of claim 6, further comprising the steps of:

attempting to connect a link for audio conversation when the emergency-informing packet is received; and executing conversation with the second Bluetooth device via the link when the link is connected.

8. The method of claim 6, wherein the radio packet containing the position information is transmitted by a dual mode Bluetooth device functioning as a slave device in a first piconet and as a master device in a second piconet, to other Bluetooth devices in the second piconet.

9. The method of claim 6, wherein the terminal operates in a sleep mode.

10. The method of claim 6, wherein the radio packet containing the position information is transmitted via an asynchronous connectionless link.

11. The method of claim 7, wherein the link for audio conversation is a synchronous connection oriented link.

* * * * *